US008463256B2

(12) United States Patent
Rush (10) Patent No.: US 8,463,256 B2
(45) Date of Patent: *Jun. 11, 2013

(54) SYSTEM INCLUDING A COMMUNICATION APPARATUS HAVING A DIGITAL AUDIO INTERFACE FOR AUDIO TESTING WITH RADIO ISOLATION (75) Inventor: Frederick A. Rush, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 1194 days.

This patent is subject to a terminal disclaimer.

(21) Appl. No.: 12/348,668

(22) Filed: Jan. 5, 2009

(65) Prior Publication Data
US 2009/0111464 A1   Apr. 30, 2009

Related U.S. Application Data (63) Continuation of application No. 11/025,674, filed on Dec. 29, 2004, now Pat. No. 7,474,893.

(51) Int. Cl.
*H04B 17/00* (2006.01)
*H03C 1/62* (2006.01)

(52) U.S. Cl.
USPC ..... 455/425; 455/423; 455/67.11; 455/67.14; 455/115.1; 455/115.2; 455/226.1

(58) Field of Classification Search
USPC ................ 455/425, 423, 67.11, 67.14, 115.1, 455/115.2, 226.1
See application file for complete search history.

(56) References Cited

U.S. PATENT DOCUMENTS

| 5,490,235 A | 2/1996 | Von Holten |
| 5,842,037 A | 11/1998 | Haartsen |
| 6,029,061 A | 2/2000 | Kohlschmidt |
| 6,308,065 B1 | 10/2001 | Molinari |
| 6,442,407 B1 | 8/2002 | Bauer |
| 6,570,884 B1 | 5/2003 | Connery |
| 6,680,913 B1 | 1/2004 | Malmivirta |

(Continued)

FOREIGN PATENT DOCUMENTS

| EP | 1128693 | 8/2001 |
| EP | 1229747 | 8/2002 |

OTHER PUBLICATIONS

"Agilent's TS-5550 Cellular Phone Functional Test Platform", Agilent Technologies, USA, Aug. 2000.

(Continued)

*Primary Examiner* — Wen Huang
(74) *Attorney, Agent, or Firm* — Meyertons, Hood, Kivlin, Kowert & Goetzel, P.C.

(57) ABSTRACT

A system includes a communication apparatus coupled to a test subsystem through a converter. The test subsystem may be configured to initiate an audio test of the communication apparatus and receive in response a set of audio test data at a predetermined constant data rate. The communication apparatus may be configured to enable output of audio test data during inactive periods of operation of an RF circuit of the communication apparatus and to disable output of audio test data during active periods of operation of the RF circuit. The converter may be configured to receive the set of audio test data from the communication apparatus and provide the set of audio test data to the test subsystem at the predetermined constant data rate during the active and the inactive periods of operation of the RF circuit.

14 Claims, 8 Drawing Sheets

U.S. PATENT DOCUMENTS

| | | | |
|---|---|---|---|
| 6,721,541 B1 * | 4/2004 | Kingsley | 455/67.11 |
| 6,898,426 B2 | 5/2005 | Matsuoka | |
| 6,963,554 B1 | 11/2005 | Weigand | |
| 7,010,271 B2 | 3/2006 | Melanson | |
| 7,024,161 B1 * | 4/2006 | LaMedica, Jr. | 455/67.11 |
| 7,324,496 B1 | 1/2008 | Sooch | |
| 7,548,625 B2 * | 6/2009 | Dorfman et al. | 381/58 |
| 2004/0037428 A1 * | 2/2004 | Keller | 381/60 |
| 2006/0040654 A1 * | 2/2006 | Moore et al. | 455/423 |
| 2006/0063525 A1 * | 3/2006 | Hazell | 455/425 |

OTHER PUBLICATIONS

"Wireless 2967 GSM 900/1800/1900 Radio Test Set", Aeroflex, USA, Part No. 46891/021, Issue 13, Mar. 2004.

International search report application No. PCT/US2005/047388 mailed May 10, 1006.

Written Option in application No. PCT/US2005/047388 mailed May 10, 1006.

* cited by examiner

SYSTEM INCLUDING A COMMUNICATION APPARATUS HAVING A DIGITAL AUDIO INTERFACE FOR AUDIO TESTING WITH RADIO ISOLATION

This application is a continuation of U.S. patent application Ser. No. 11/025,674, entitled "SYSTEM INCLUDING A COMMUNICATION APPARATUS HAVING A DIGITAL AUDIO INTERFACE FOR AUDIO TESTING WITH RADIO ISOLATION", filed Dec. 29, 2004 now U.S. Pat. No. 7,474,893.

BACKGROUND OF THE INVENTION

1. Field of the Invention

This invention relates generally to communication apparatus including radio frequency (RF) circuits and, more particularly, to digital audio interfaces within communication apparatus that accommodate audio testing.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often important to minimize noise and interference from sources external or even internal to the communication apparatus.

In addition to the RF front-end circuitry, typical wireless communication apparatus may also include digital processing circuitry that performs various digital functions including, for example, low level baseband signal processing, implementation of the communication protocol stack, and various user interface functionality. The digital processing circuitry may include a variety of specific hardware such as a DSP (digital signal processor), an MCU (microcontroller unit), hardware accelerators, memory, and/or I/O interfaces, among numerous other specific hardware devices.

Unfortunately, the digital processing circuitry of a typical communication apparatus can be a significant source of detrimental noise and interference. More particularly, the digital processing circuitry in a typical high performance communication apparatus produces digitals signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, cause spurious emissions that may interfere with, and may adversely impact, the performance of the RF front-end circuitry. Thus, in many systems, the RF front-end circuitry is implemented on an integrated circuit die that is separate from the integrated circuit die on which the digital processing circuitry is implemented. Additionally, the RF front-end circuitry and digital processing circuitry are often placed in separate electrical cavities, where the shielding of the cavities helps to isolate the electrical and magnetic coupling.

Implementing the RF front-end circuitry and the digital processing circuitry on separate dies, however, has several disadvantages, such as increased component count, size, and overall cost, and more potential for decreased reliability and increased manufacturing failures. It is thus desirable to allow integration of the RF front-end circuitry and digital processing circuitry on a single integrated circuit die without significant degradation of performance due to interference.

In addition to the foregoing design considerations, it is typically required to accommodate measurement of the acoustic properties of communication apparatus using test equipment with standardized acoustic and electrical interfaces. Various telecommunications industry groups may specify acoustic audio tests for communication apparatus. For example, the 3rd Generation Partnership Project (3GPP) is a collaboration agreement among a number of telecommunications standards bodies. A 3GPP published specification, TS 44.014, specifies a standard electrical interface for acoustic testing of wireless communication apparatus commonly referred to as the Digital Audio Interface (DAI). More specifically, for GSM mobile phones, TS 44.014 requires that within the DAI, the digital audio input to the test equipment be a bidirectional serial connection clocked at a constant 104 kbits/s. Numerous test equipment vendors market equipment that conforms to this standard. In practice, it is typical for communication apparatus to be equipped with a standard DAI interface.

SUMMARY OF THE INVENTION

Various embodiments of a system including a communication apparatus having a digital audio interface for audio testing are disclosed. In one embodiment, a system includes a communication apparatus (e.g., a mobile phone) coupled to a test subsystem through a converter. The test subsystem may be configured to initiate an audio test of the communication apparatus and receive in response a set of audio test data at a predetermined constant data rate. The communication apparatus may be configured to enable output of audio test data during inactive periods of operation of an RF circuit of the communication apparatus and to disable output of audio test data during active periods of operation of the RF circuit. The converter may be coupled to receive the set of audio test data output from the communication apparatus and may be configured to provide the set of audio test data to the test subsystem at the predetermined constant data rate during the active and the inactive periods of operation of the RF circuit. In some embodiments, a portion of a digital processing circuit of the communication apparatus may be disabled during active periods of operation of the RF circuit.

In another embodiment, a system includes a communication apparatus coupled to a test subsystem through a converter. The test subsystem may be configured to initiate an audio test of the communication apparatus and receive in response a set of audio test data at a predetermined constant data rate. The communication apparatus may be configured to alternately enable and disable the output of the set of audio test data during the audio test. The converter may be coupled to receive the set of audio test data output from the communication apparatus and may be configured to provide the set of audio test data to the test subsystem at the predetermined constant data rate. In some embodiments, the communication apparatus includes a radio frequency (RF) circuit coupled to a digital processing circuit. The digital processing circuit may be configured to enable the output of the set of audio test data during inactive periods of operation of the RF circuit and to disable the output of audio test data during active periods of operation of the RF circuit.

In a further embodiment, a system includes a communication apparatus coupled to a test subsystem through a converter. The test subsystem may be configured to initiate an audio test of the communication apparatus, transmit a set of audio test data at a predetermined constant data rate, and receive in response acoustic audio transmissions from the communication apparatus. The converter may be coupled to receive the set of audio test data output from the test subsystem at the predetermined constant data rate. The communication apparatus may be configured to cause the converter to transmit audio test data to the communication apparatus during inactive periods of operation of an RF circuit of the communication apparatus and disable transmission of audio test data to the communication apparatus during active periods of operation of the RF circuit. In some embodiments, a portion of a digital processing circuit of the communication apparatus may be disabled during active periods of operation of the RF circuit.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
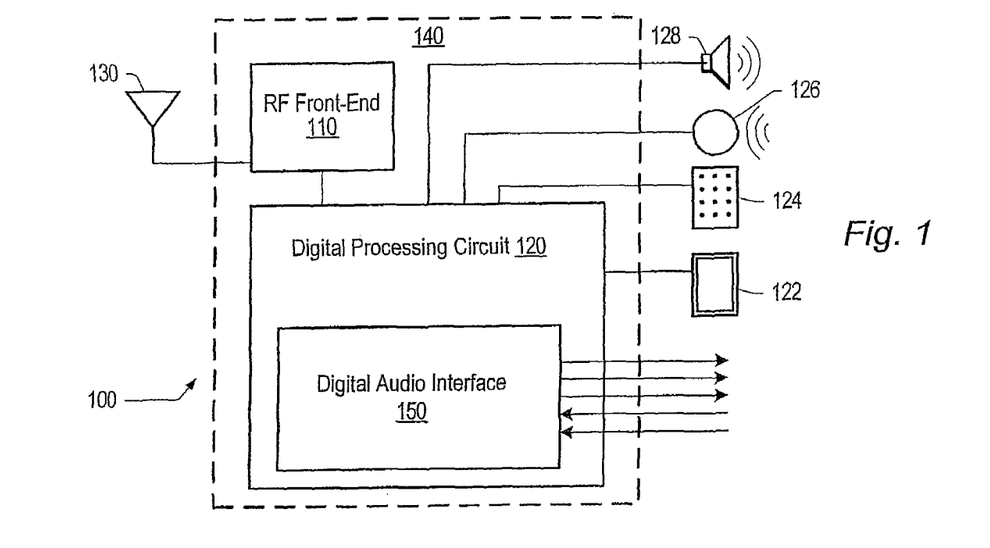
FIG. 1 illustrates a generalized block diagram of a communication apparatus including an RF front-end circuit and a digital processing circuit.

FIG. 1 illustrates a generalized block diagram of a communication apparatus 100 including an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement the Global System for Mobile Communications (GSM) standard, the Personal Communications Service (PCS) standard, the Digital Cellular System (DCS) standard, the General Packet Radio Service (GPRS) standard, and/or the Enhanced General Packet Radio Service standard (E-GPRS), which may also be referred to as the Enhanced Data for GSM Evolution (EDGE) standard, among others.

RF front-end circuit 110 may accordingly include circuitry to provide the RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP, as well as a variety of specific peripheral circuits such as memory controllers, direct memory access (DMA) controllers, hardware accelerators, voice coder-decoders (CODECs), UARTs (universal asynchronous receiver transmitters), and user interface circuitry. The choice of digital processing hardware (and firmware/software, if included) depends on the design and performance specifications for a given desired implementation, and may vary from embodiment to embodiment.

As shown, digital processing circuit 120 also includes a digital audio interface (DAI) 150. DAI 150 is provided to accommodate communication with external test equipment during acoustic testing of the audio qualities of communication apparatus 100. Further details regarding implementations of DAI 150 will be provided below.

Figure 2:
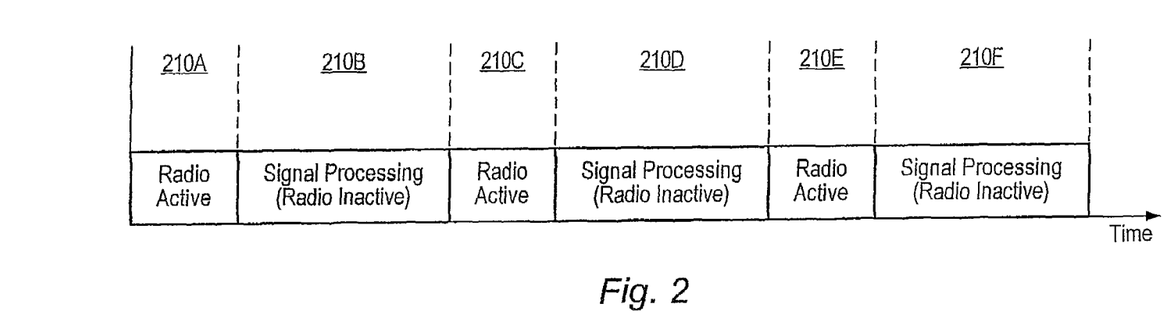
FIG. 2 illustrates a set of events that occur in a communication apparatus according to time domain isolation.

In one embodiment, RF front-end circuit 110 and digital processing circuit 120 may be integrated on the same integrated circuit die 140. To reduce interference and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities so as to avoid or reduce interference between the RF front-end circuit 110 and the digital processing circuit 120.

As shown in FIG. 2, communication apparatus 100 employs a plurality of time-slots 210A-210F, and so on. During RF time-slots 210A, 210C and 210E, RF front-end circuit 110 may receive RF signals, process the received signals, and store the results. Subsequently, during signal-processing time-slots 210B, 210D and 210F, respectively, digital processing circuit 120 may perform signal processing tasks on the stored results. As will be described further below, in one embodiment DAI 150 is configured to transmit and receive audio test data during signal-processing time-slots 210B, 210D, and 210F.

Alternatively, during RF time-slots 210A, 210C, and 210E, RF front-end circuit 110 may transmit RF signals. Thus, in this mode of operation, during signal-processing time-slots 210B and 210D, digital processing circuit 120 performs signal processing tasks on input data (e.g., voice, data), and stores the results. Subsequently, during RF time-slots 210C and 210E, respectively, RF front-end circuit 110 may perform RF operations on the stored results (for example, up-conversion) and transmit an RF signal.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 may be placed in a shutdown mode of operation when an RF time-slot commences (i.e., when the radio is active). In one embodiment, during the shutdown mode of operation, a clock signal or signals within digital processing circuit 120 are disabled or inhibited. More specifically, by using static metal oxide semiconductor (MOS) circuitry, for example, the clock signal or signals within the digital processing circuit 120 may be shut down without losing data present within that circuitry. Accordingly, the digital processing circuit 120 can preserve the data within it while the RF front-end circuit 110 is active. Once the RF front-end circuit 110 has completed its reception or transmission (e.g., an RF time-slot has ended), the shutdown mode of digital processing circuit 120 may be discontinued by re-enabling the clock signal or signals. Digital processing operations on the data may then continue or commence. By disabling the clock or clocks in digital processing circuit 120 while RF front-end circuit 110 is active (i.e., receiving or transmitting), the amount of digital noise and thus spurious signals at the RF band of interest may be reduced, thus accommodating high performance.

It is noted that although FIG. 2 depicts the operation of the RF front-end circuit 110 and the digital processing circuit 120 as alternative events, these operations need not be mutually exclusive. Generally, it may be desirable to reduce or minimize the amount of overlap between the operation of the RF front-end circuit 110 and the digital processing circuit 120. Depending on a number of factors, however, the active operation of RF front-end circuit 110 and signal processing operations of digital processing circuit 120 may overlap to a certain extent.

It is also noted that in some alternative embodiments, the shutdown mode of digital processing circuit 120 may be implemented by causing at least portions of the circuitry to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that some portions of the digital processing circuit 120, such as dynamic memory, may remain active during the shutdown mode (i.e., the circuitry of digital processing circuitry 120 may be partially powered down, disabled, or inhibited during the shutdown mode).

Figure 3:
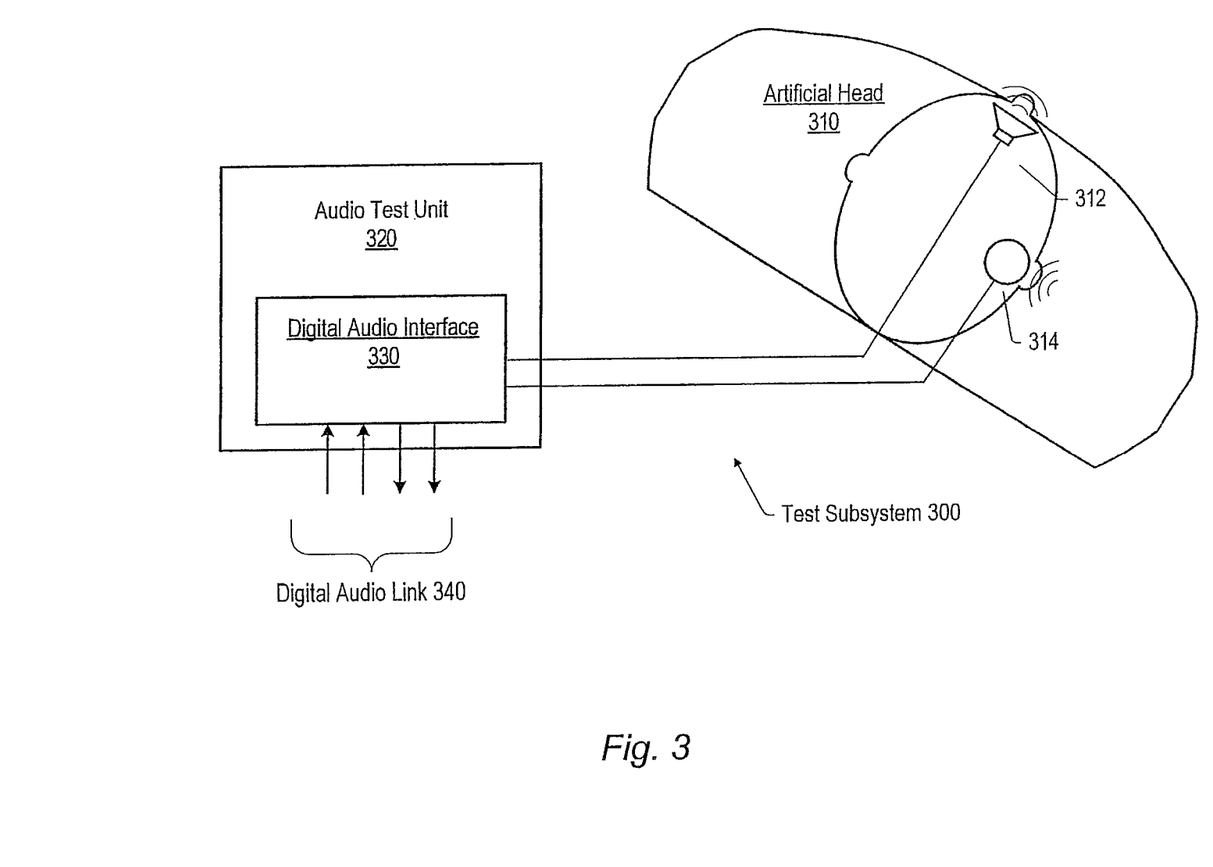
FIG. 3 illustrates a generalized block diagram of a test subsystem used to test the audio qualities of communication apparatus.

FIG. 3 illustrates a generalized block diagram of a test subsystem 300 used to test the audio qualities of communication apparatus. Test subsystem 300 may be assembled to conform to standards set by, for example, 3GPP specification TS 51.010. In the illustrated embodiment, the test subsystem includes an artificial head 310 connected to an audio test unit 320. Test unit 320 is illustrative of test equipment available from multiple vendors including, for example, the HP/Agilent 8922H and the Rohde & Schwarz UPL 16. As shown, artificial head 310 may contain a speaker 312 inside an artificial mouth and a microphone 314 inside an artificial ear.

Test unit 320 may include a digital audio interface (DAI) 330 configured to facilitate communication of digital audio test data between the audio test unit 320 and a communication device being tested. As discussed previously, in some embodiments, the digital audio interface 330 of audio test unit 320 may implement a standardized, bi-directional digital audio link 340 that transfers test data at a predetermined constant data rate, such as 104 kbits/s, during an audio test. However, in accordance with the time domain isolation techniques discussed above, some embodiments of communication apparatus 100 may disable portions of digital processing circuit 120 during periods of RF activity. These periods may overlap with times of an audio test at which test unit 320 is required to transmit and/or receive digital audio test data at the predetermined constant data rate.

Figure 4:
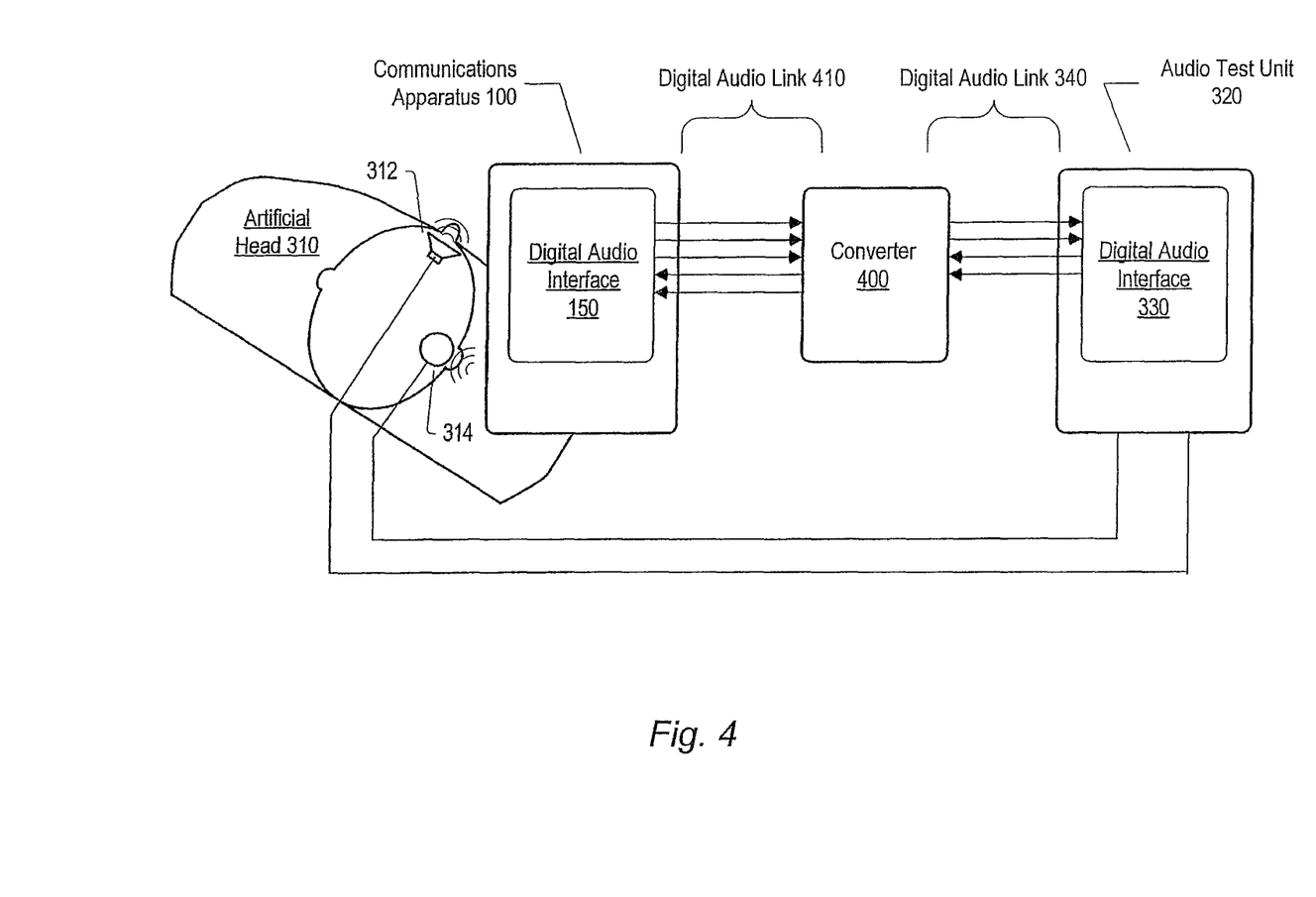
FIG. 4 illustrates a generalized block diagram of an audio test system including a converter coupled between a communication apparatus and test unit.

Accordingly, FIG. 4 illustrates a generalized block diagram of an audio test system including a converter 400, located outside of a housing of communication apparatus 100, and coupled between communication apparatus 100 and test unit 320. In particular, DAI 330 of test unit 320 is coupled to one port of converter 400 via digital audio link 340, while DAI 150 of communication apparatus 100 is coupled to a second port of converter 400 via digital audio link 410. In some embodiments, DAI 150 may be among the portions of digital processing circuit 120 that are disabled during periods of RF activity. Thus, in one implementation, DAI 150 enables transmission and/or reception of audio test data during signal-processing time-slots and disables transmission and/or reception of audio test data during RF time-slots, while DAI 330 transmits and/or receives audio test data at a predetermined constant data rate during both signal-processing and RF timeslots. Converter 400 is provided to facilitate such communications.

Audio test unit 320 may be configured to perform any one or more of a variety of specific types of audio tests on communication apparatus 100. During one type of test operation, test unit 320 may initiate an audio test, causing DAI 330 to transmit a set of audio test data via link 340 to converter 400 at a predetermined constant data rate. Converter 400 buffers data of the set of audio test data as it is received. During signal-processing time-slots, converter 400 may receive a clock signal from DAI 150, enabling a transmission of audio test data via link 410 to DAI 150. During RF-timeslots, the clock signal may be disabled by DAI 150, interrupting transmission of audio test data via link 410 to DAI 150. Once received by DAI 150, audio test data may be processed by circuitry within communication apparatus 100, as described below, resulting in an acoustic audio response from speaker 128 (i.e., the speaker of communication apparatus 100, FIG. 1). Microphone 314 of artificial head 310 may be placed close to speaker 128 in order to receive the acoustic audio, convert the acoustic audio to an analog audio signal, and transmit this signal to test unit 320 for analysis.

Likewise, test unit 320 may initiate another type of audio test that includes transmitting an analog audio signal to speaker 312 of artificial head 310, which then produces acoustic audio. Microphone 126 (i.e., the microphone of communication apparatus 100, FIG. 1) may be placed close to speaker 312 in order to receive the acoustic audio and convert it to an analog audio signal. This analog audio signal may then be processed by circuitry within communication apparatus 100, as described below, resulting in a transmission of a set of audio test data from DAI 150 to converter 400 via link 410. Portions of the set of audio test data may be transmitted during signal-processing time-slots, while the transmission may be disabled during RF-timeslots. Converter 400 buffers the audio test data received from DAI 150 and converts it into a transmission at a predetermined constant data rate. This transmission conveys the set of audio test data via link 340 to DAI 330 within test unit 320, where it may be analyzed. Various specific electrical and acoustic characteristics of the communication apparatus may be measured according to these tests, as desired.

Figure 5:
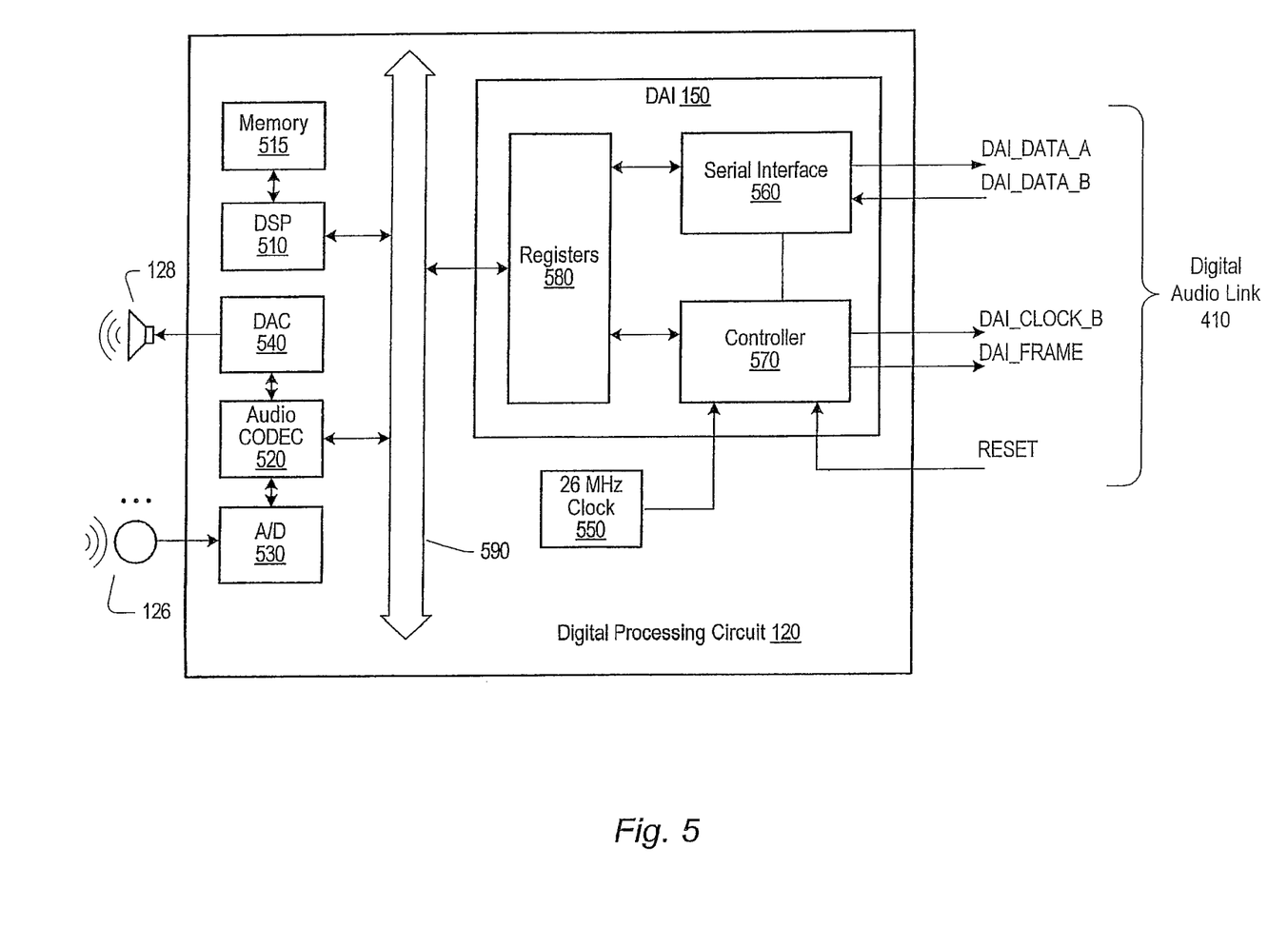
FIG. 5 illustrates an example of an implementation of circuitry within a digital processing circuit of a communication apparatus.

FIG. 5 illustrates an exemplary implementation of circuitry within digital processing circuit 120. In the example shown, digital processing circuit 120 includes a digital signal processor (DSP) 510 coupled to shared bus 590. Various peripherals used for processing and converting digital audio are shown coupled to shared bus 590, including one embodiment of DAI 150 and a voice coder decoder (CODEC) 520. An analog-to-digital converter (A/D) 530 and a digital-to-analog converter (DAC) 540 are shown coupled to CODEC 520. It is noted that various alternative peripherals may be provided, as desired, depending on the desired functionality. It is further noted that a bus bridge may be attached to shared bus 590 to connect to a microcontroller bus thereby permitting a microcontroller to access the signal processing portions of digital processing circuit 120 as well as to perform other digital processing functions as desired. Digital processing circuit 120 may also include clock 550, which in one embodiment provides a 26 MHz timing reference to DAI 150.

During operation, A/D 530 receives analog audio signals from microphone 126 and converts them to digital audio data. Depending on the application, this digital audio data may be encoded by CODEC 520, processed by DSP 510, stored temporarily in memory 515, or otherwise processed and buffered as desired. In addition, shared bus 590 may provide digital audio data from various sources including DSP 510 and DAI 150 to DAC 540 through CODEC 520. DAC 540 converts digital audio data to analog audio signals that drive speaker 128.

As shown in FIG. 5, DAI 150 includes a number of components that together may be configured to send and receive a set of audio test data. In the illustrated embodiment, DAI 150 includes a serial interface 560, a controller 570, and a set of registers 580. Serial interface 560 converts parallel audio test data received from registers 580 into serial data for output on link 410. Serial interface 560 also converts serial audio test data received from link 410 into parallel data to be stored in registers 580. Registers 580 provide storage for audio test data going to and coming from shared bus 590. Registers 580 also provide bus interface logic between DAI 150 and shared bus 590, allowing DSP 510 access to control and status signals associated with DAI 150. Controller 570 may perform a number of different functions related to the flow of audio test data and control signals through DAI 150, as desired. For example, controller 570 may be configured to control the clocking of data to and from serial interface 560, receive control signals from link 410, deliver clock signals to link 410, and deliver audio test control signals to and from registers 580. As previously noted, in one embodiment, digital processing circuit 120 includes a 26 MHz clock 550 coupled to controller 570. In the illustrated embodiment, controller 570 uses clock 550 as a timing reference to produce lower frequency clock signals in order to perform the clock controlling functions noted above. In other embodiments, clock 550 may operate at another frequency, either higher or lower than 26 MHz, while controller 570 may be configured to apply an appropriate scaling factor to produce the desired lower frequency clock signals. Depending on the application, controller 570 may operate on other control and status signals, as desired. The operation of one embodiment of controller 570 during an audio test is described in greater detail below.

In accordance with the time domain isolation functionality of communication apparatus 100 as discussed above, portions of digital processing circuit 120 are active during signal-processing time-slots and are at least partially disabled during RF time-slots. In one embodiment, DAI 150, DSP 510, and CODEC 520 are disabled during RF time-slots. Referring collectively to FIGS. 4 and 5, during operation of one implementation as described above, test unit 320 may initiate an audio test by passing a signal from DAI 330 to converter 400. The signal to initiate an audio test may be accompanied by additional control signals (not shown) that indicate the type of test to be performed. These signals may be forwarded to controller 570 by converter 400 through link 410. Controller 570 may be configured to store the state of these signals in one of registers 580, where they are accessible by various components that are coupled to shared bus 590. Depending on the type of the desired audio test, acoustic audio may be received by microphone 126 and processed through digital processing circuit 120, where a set of audio test data is generated in response and delivered to link 410. Alternatively, a set of audio test data may be received on link 410 and processed by digital processing circuit 120, where acoustic audio is generated in response and delivered to speaker 128. A variety of tests may be performed in this manner depending on the test data produced by test unit 320. In some alternative embodiments, a single audio test may comprise passing data through digital processing circuit 120 in both directions, transmitting and receiving on link 410 simultaneously.

In an audio test in which analog audio signals are received from microphone 126 by A/D 530, A/D 530 converts analog audio to digital audio data during signal-processing and RF time-slots. Since in one embodiment digital signal processing is shutdown during RF time-slots, A/D 530 is configured to temporarily store digital audio data produced during RF time-slots until the data can be transmitted through CODEC 520 and over shared bus 590 during signal-processing time-slots. During signal-processing time-slots, in one embodiment, a variety of activities may occur. For example, in one implementation, audio test data from A/D 530 may be conveyed to CODEC 520 and DSP 510, processed and stored in memory 515. DSP 510 may write audio test data that is stored in memory 515 to DAI 150 via shared bus 590. More specifically, audio test data may be transferred from memory 515 to registers 580 and subsequently delivered to serial interface 560. Controller 570 may control the clocking of audio test data output from serial interface 560 to link 410. In addition, controller 570 may deliver clock and synchronization signals to link 410, with a data rate and timing sequence that may depend on the particular implementation.

In an audio test in which a set of audio test data is received from link 410, in one embodiment a clock signal is delivered from controller 570 within DAI 150 to link 410 during signal-processing time-slots since DAI 150 may be disabled during RF time-slots. Consequently, in one embodiment, another sequence of activities may occur during signal-processing time-slots. Specifically, audio test data may be input to serial interface 560 from link 410 with a clock rate and timing sequence that may depend on the particular implementation. Controller 570 may control the clocking of audio test data from serial interface 560 into registers 580. Data that is stored in registers 580 may be processed by CODEC 520 and DSP 510 and stored in memory 515 or otherwise processed, depending upon the desired application. CODEC 520 may deliver audio test data to DAC 540, which may be configured to buffer the audio test data. During signal-processing time-slots and RF time-slots, DAC 540 may convert audio test data to analog signals that drive speaker 128, in order to produce smooth acoustic audio.

Details of one embodiment of digital audio link 410 are also shown in FIG. 5. In the illustrated embodiment, link 410 comprises a first serial data connection carrying data from DAI 150 to converter 400, a second serial data connection carrying data from converter 400 to DAI 150, and connections for conveying a reset signal originating from converter 400 and clock and frame synchronization signals originating from DAI 150.

Figure 6:
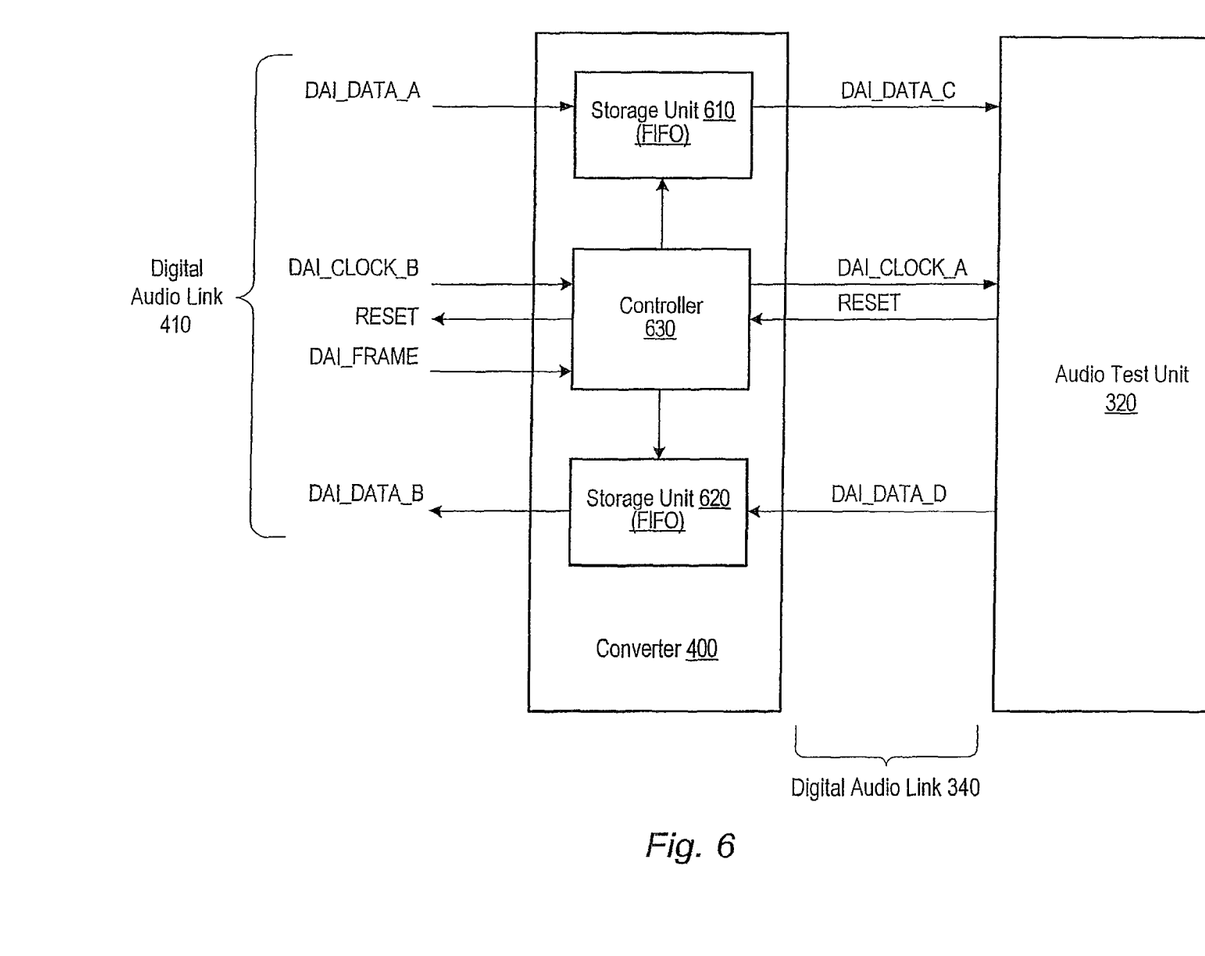
FIG. 6 illustrates one embodiment of a converter coupled to two digital audio links.

FIG. 6 illustrates one embodiment of converter 400 coupled to both link 410 and link 340. In this embodiment, converter 400 includes a storage unit 610 for temporarily buffering data received from link 410. In one implementation, storage unit 610 is a first-in, first-out memory (FIFO). In operation, controller 630 controls the clocking of data into storage unit 610 using clock and synchronization signals received from link 410. Controller 630 provides a predetermined constant data rate clock to storage unit 610 to control data output to digital audio link 340. Similarly, a second storage unit 620 may be included in converter 400 for temporarily storing data received from link 340 and outputting the data to link 410. In one implementation, storage unit 620 is also a FIFO. In operation, controller 630 provides a predetermined constant data rate clock to storage unit 620 to control data input from digital audio link 340. Controller 630 controls the clocking of data out of storage unit 620 to link 410 using clock and synchronization signals received from link 410. Reset and control signals may be passed through controller 630 from link 340 to link 410.

In one implementation DAI_CLOCK_A operates at a constant rate of 104 kHz and DAI_CLOCK_B operates during signal-processing time-slots at a data rate that is a multiple of 104 kHz. For an audio test in which DAI 150 is transmitting data, the data rate of DAI_CLOCK_B should be sufficient to ensure that storage unit 610 receives enough data during a signal-processing time-slot to continue to output data to link 340 during the next RF time-slot. For an audio test in which DAI 150 is receiving data, the data rate of DAI_CLOCK_B may be sufficient to empty storage unit 620 during a signal-processing time-slot, ensuring that there is enough capacity in storage unit 620 to accommodate data received from link 340 during the next RF time-slot while DAI_CLOCK_B is off. The rate of DAI_CLOCK_B may depend on the relative durations of RF time-slots and signal-processing time-slots. Controller 570 may be configured to control the data rate and duration of DAI_CLOCK_B. For example, in the case that RF time-slots and signal-processing time-slots are of equal duration and frequency, DAI_CLOCK_B may operate at twice the data rate of DAI_CLOCK_A. In alternative implementations, controller 570 may be configured to set the ratio of the rates of DAI_CLOCK_B and DAI_CLOCK_A to various other values. For example, DAI_CLOCK_B may have a data rate high enough to fill storage unit 610 and empty storage unit 620 in less time than the duration of a signal-processing time-slot. It is noted that in one embodiment, clock rate information may be written into one of registers 580 by DSP 510 and subsequently read by controller 570 to establish the on and off durations of DAI_CLOCK_B.

Figure 7:
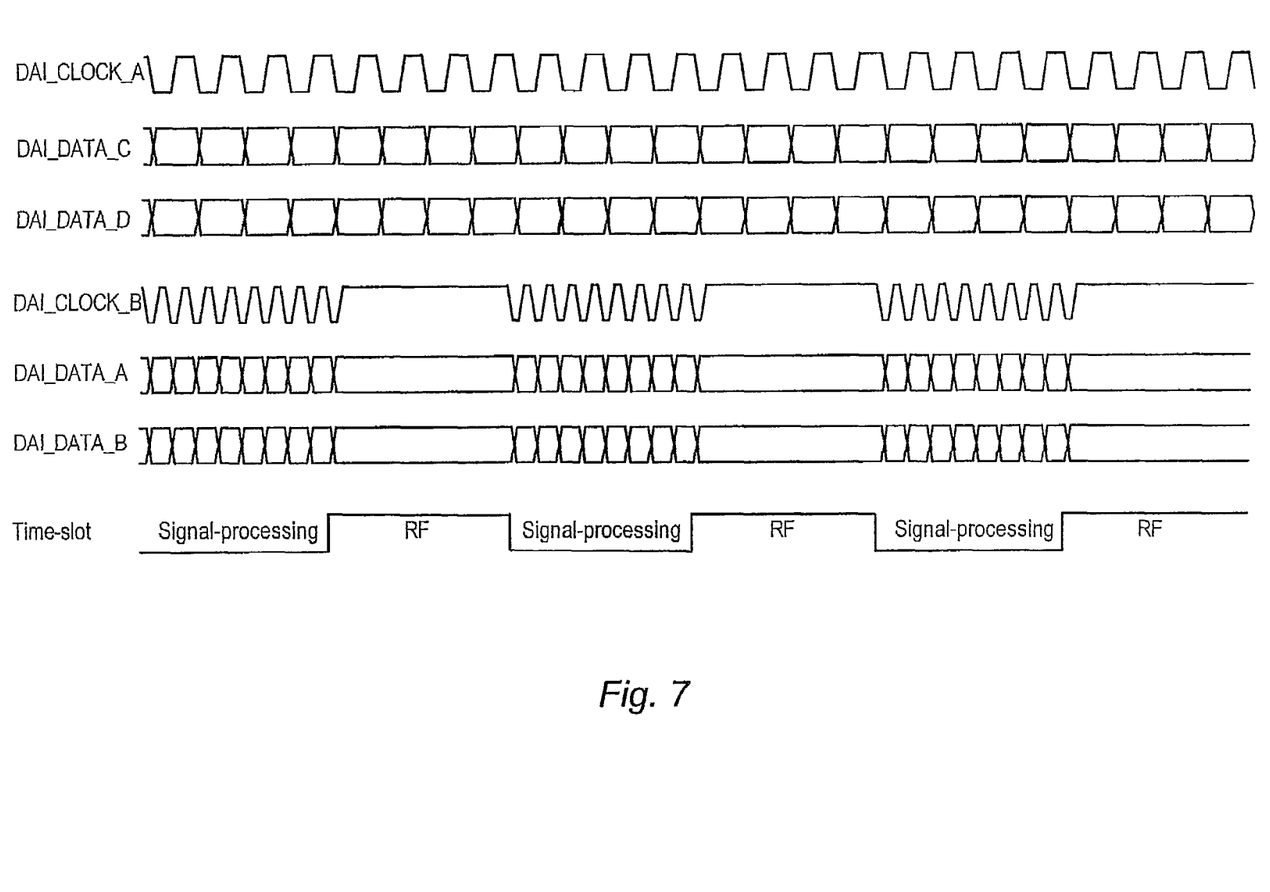
FIG. 7 illustrates a timing of a constant rate clock and a clock that is disabled during RF activity.

FIG. 7 illustrates a timing of a constant data rate DAI_CLOCK_A compared to DAI_CLOCK_B operating at twice the data rate of DAI_CLOCK_A and disabled during RF time-slots. As illustrated, DAI_CLOCK_B is active during signal-processing time-slots. Since DAI_CLOCK_A controls the output of data from storage unit 610 to link 340 (DAI_DATA_C), converter 400 outputs data to link 340 at a constant data rate through both signal-processing and RF time-slots as shown. Similarly, since DAI_CLOCK_A controls the input of data from link 340 to storage unit 620 (DAI_DATA_D), converter 400 inputs data from link 340 at a constant data rate through both signal-processing and RF time-slots. Referring collectively to FIGS. 6 and 7, it may be seen that during an audio test, DAI_DATA_A is input to storage unit 610 at a faster rate than DAI_DATA_C is output to link 340 during a signal-processing time-slot since DAI_CLOCK_B is faster than DAI_CLOCK_A. Subsequently, during the next RF time-slot, DAI_DATA_C is output from storage unit 610 to link 340 at the same constant data rate as during a signal-processing time-slot, but DAI_CLOCK_B inputs no additional DAI_DATA_A to storage unit 610. The net effect is to drain storage unit 610, making space available for the next burst of DAI_DATA_A. Similarly, DAI_DATA_B is output from storage unit 620 at a faster rate than DAI_DATA_D is input from link 340 during a signal-processing time-slot since DAI_CLOCK_B is faster than DAI_CLOCK_A. Therefore, storage unit 620 is emptied in preparation for the next RF time-slot. Subsequently, during the next RF time-slot, no DAI_DATA_B is output from storage unit 620 and data builds up from DAI_DATA_D under the control of constant data rate clock DAI_CLOCK_A.

Figure 8:
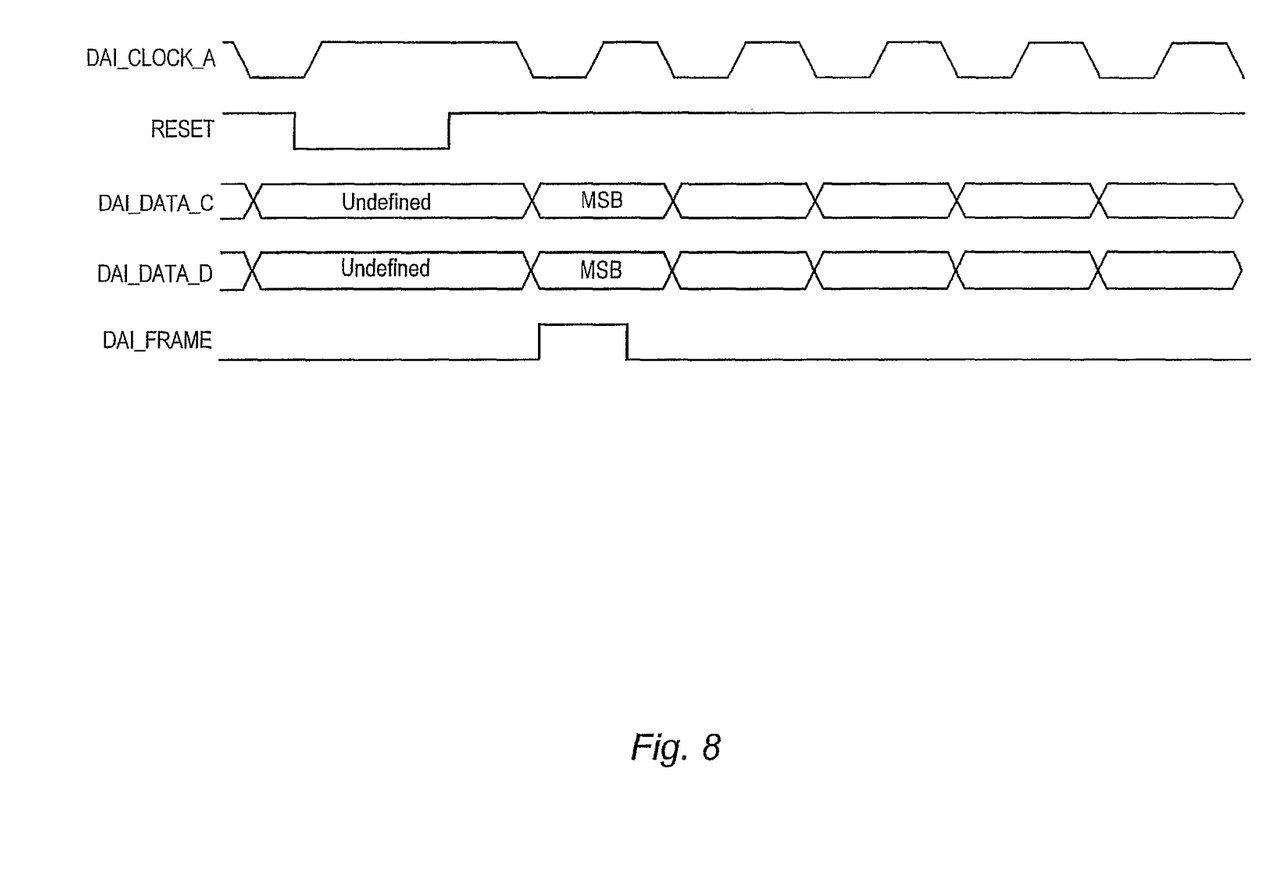
FIG. 8 illustrates a timing of initiation of an audio test.

In one embodiment, communication apparatus 100 is prepared for an audio test by operating digital processing circuit 120 for a sufficient period of time to fill storage unit 610 with a set of audio test data and to empty storage unit 620. Once these conditions are met, test unit 320 may initiate an audio test by sending a reset signal to converter 400. FIG. 8 is a timing diagram of signals on link 340 in which test unit 320 initiates an audio test. Constant data rate clock DAI_CLOCK_A controls the output of data from storage unit 610 to link 340 (DAI_DATA_C) and the input of data from link 340 to storage unit 620 (DAI_DATA_D). In the illustrated implementation, the falling edge (assertion) of RESET interrupts DAI_CLOCK_A. Subsequently, a rising edge (deassertion) of RESET restarts DAI_CLOCK_A. Independently, link 410 may continue to transmit and receive audio test data in an intermittent fashion.

Figure 9:
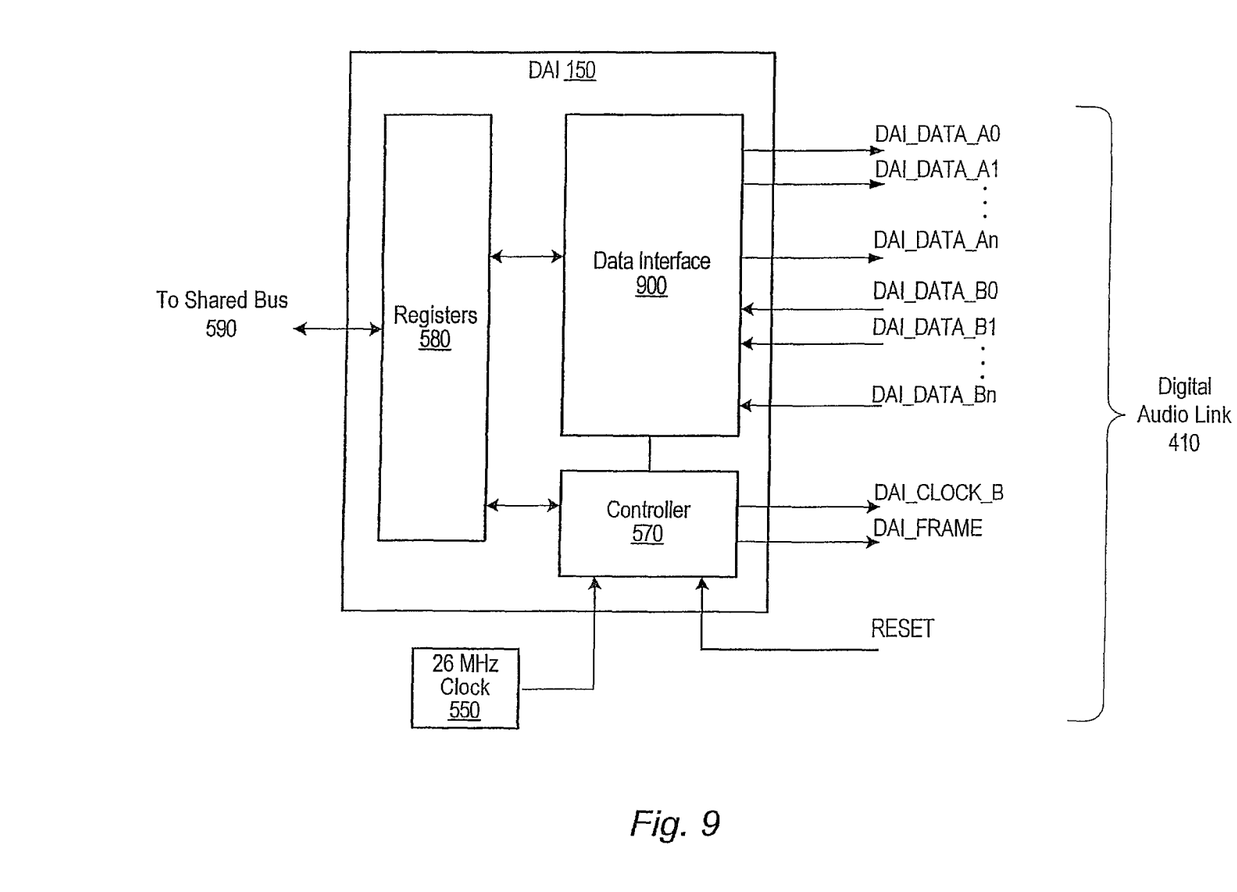
FIG. 9 illustrates an alternative embodiment of a digital audio interface.

FIG. 9 illustrates an alternative embodiment of DAI 150. In this embodiment, DAI 150 includes data interface 900 coupled to digital audio link 410. Data interface 900 may include multiple data connections in and out of link 410, resulting in higher effective data rates than the equivalent data rate obtained with serial interface 560 for a given DAI_CLOCK_B clock frequency. The substitution of data interface 900 for serial interface 560 converts audio link 410 from a full duplex serial data connection to a set of parallel, full duplex data connections, multiplying the effective data rate of the link. Various combinations of parallel data connection widths and data rates may be configured as desired to satisfy the demands of the RF and signal-processing time-slots.

It is noted that other variations of the embodiments described above are also possible. For example, converter 400 may be implemented as an integral part of test unit 320. In particular, converter 400 may be combined with DAI 330 to form a single component of test unit 320. Also, in some embodiments, a successive portion of the set of audio test data may be transmitted to and/or from DAI 150 during each of a succession of signal-processing time-slots. In other embodiments, a successive portion of the set of audio test data may be transmitted to and/or from DAI 150 during selected signal-processing time-slots, e.g. every other signal-processing time-slot.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a communication apparatus;
   a test subsystem configured to initiate an audio test of the communication apparatus, wherein the test subsystem is configured to receive, in response to the audio test, a set of audio test data at a predetermined constant data rate, and wherein the communication apparatus is configured to alternately enable and disable the output of the set of audio test data during the audio test; and
   a converter coupled to receive the set of audio test data output from the communication apparatus;
   wherein the communication apparatus includes a radio frequency (RF) circuit coupled to a digital processing circuit, wherein the digital processing circuit is configured to enable the output of the set of audio test data during inactive periods of operation of the RF circuit and to disable the output of audio test data during active periods of operation of the RF circuit; and
   wherein the converter is configured to provide the set of audio test data to the test subsystem at the predetermined constant data rate during the active and inactive periods of operation of the RF circuit.

2. A system comprising:
   a communication apparatus including a radio frequency (RF) circuit coupled to a digital processing circuit, wherein the RF circuit and the digital processing circuit each have active and inactive periods of operation;
   a test subsystem configured to initiate an audio test of the communication apparatus, wherein the test subsystem is configured to transmit a set of audio test data at a predetermined constant data rate and receive in response, acoustic audio transmissions from the communication apparatus; and
   a converter coupled to receive the set of audio test data output from the test subsystem at the predetermined constant data rate during active and inactive periods of operation of the RF circuit;
   wherein the communication apparatus is configured to cause the converter to transmit the set of audio test data to the communication apparatus during inactive periods of operation of the RF circuit and suspend the transmission of the set of audio test data to the communication apparatus during active periods of operation of the RF circuit.

3. The system as recited in claim 2, wherein at least a portion of the digital processing circuit is disabled during at least a portion of the duration of active periods of operation of the RF circuit.

4. The system as recited in claim 2, wherein the transmission of the set of audio test data to the communication apparatus during inactive periods of operation of the RF circuit includes transmission via a serial connection between the communication apparatus and the converter at a higher data rate than the predetermined constant data rate.

5. The system as recited in claim 2, wherein the transmission of the set of audio test data to the communication apparatus during inactive periods of operation of the RF circuit includes transmission via multiple connections between the communication apparatus and the converter.

6. The system as recited in claim 2, wherein the converter includes a storage device configured to temporarily buffer at least a portion of the set of audio test data.

7. The system as recited in claim 2, wherein the test subsystem includes:
   an artificial head with a microphone; and
   a test unit configured to receive audio data from the microphone, wherein acoustic audio transmissions are conveyed from the communication apparatus to the microphone dependent on the set of audio test data transmitted to the communication apparatus.

8. A method of performing an audio test of a communication apparatus, the method comprising:
   a test subsystem providing a signal to the communication apparatus to initiate the audio test;
   the communication apparatus generating a set of audio test data for the test subsystem in response to the signal;
   the communication apparatus alternately enabling and disabling the output of the set of audio test data coincident with respective inactive and active periods of operation of a radio frequency (RF) circuit within the communication apparatus;
   a converter receiving the set of audio test data during the inactive periods of operation of the RF circuit;
   the converter transmitting the set of audio test data to the test subsystem at the predetermined constant data rate during the active and the inactive periods of operation of the RF circuit.

9. The method as recited in claim 8, further comprising the communication apparatus transmitting the set of audio test data to the converter at a higher data rate than the predetermined data rate.

10. The method as recited in claim 9, wherein the communication apparatus transmitting the set of audio test data further comprises the communication apparatus conveying the set of audio test data in parallel over a plurality of data lines.

11. The method as recited in claim 9, wherein the communication apparatus transmitting the set of audio test data further comprises the communication apparatus conveying the set of audio test data serially over a single data line of a first communication link.

12. The method as recited in claim 11, wherein the converter transmitting the set of audio test data further comprises the communication apparatus conveying the set of audio test data serially over a single data line of a second link, wherein the first link and the second link correspond to a digital audio interface (DAI) link.

13. A method of performing an audio test of a communication apparatus, the method comprising:
   transmitting a set of audio test data from the test subsystem to a converter at a predetermined constant data rate via a first interface during inactive and active periods of operation of a radio frequency (RF) circuit within the communication apparatus;
   buffering the set of audio test data within the converter;
   alternately enabling and disabling a transmission of the set of audio test data from the converter to the communication apparatus coincident with respective inactive and active periods of operation of the RF circuit;
   generating an acoustic audio output from the communication apparatus in response to receiving the set of audio test data; and
   providing the acoustic audio to the test subsystem.

14. The method as recited in claim 13, further comprising the converter transmitting the set of audio test data to the communication apparatus at a higher data rate than the predetermined data rate.

* * * * *